Patented Apr. 8, 1947

2,418,684

UNITED STATES PATENT OFFICE 2,418,684

SELENIUM RUBY GLASS

John M. Youel, Baton Rouge, La., assignor to E. I. du Pont de Nemours & Company, Wilmington, Del., a corporation of Delaware No Drawing. Application May 23, 1945, Serial No. 595,481

8 Claims. (Cl. 106—52)

This invention relates to the production of selenium ruby glass, and more particularly it relates to an improvement in the process and batch compositions for the production of selenium ruby glass.

The production of selenium ruby glass by the addition of selenium or a selenium compound, for example, selenium oxide, sodium selenite or barium selenite together with a cadmium compound, for example, cadmium sulfide, cadmium selenide or cadmium sulfo selenide to a glass batch composition is well known. In previously known processes for the production of selenium ruby glass difficulty has been encountered in satisfactorily controlling the selenium content in the resulting glass. Selenium is volatile at the melting temperatures of glass and considerable quantities are lost as a result of this volatility, especially in the early stages of the melting operation. Such loss of selenium makes it difficult to control or regulate the color of the glass, increases the cost of the process, and the selenium fumes constitute a health hazard to the operators carrying out the process. To reduce this loss and decrease the health hazard, it has been customary to produce selenium ruby glass in closed pots by a batch melting process which is disadvantageous because of poor efficiency of heating. Furthermore, color control is difficult and selenium loss is considerable even when employing a closed pot melting process.

It is an object of this invention to provide a method for the production of selenium ruby glass in which selenium will be less readily lost from the composition during the melting thereof.

It is a further object of this invention to provide a glass batch composition for the production of selenium ruby glass which batch composition may be melted, either by a pot melting procedure or a continuous tank melting procedure, with a minimum loss of selenium.

It is still a further object of this invention to produce selenium ruby glass with a minimum consumption of selenium or selenium compound.

Another object of this invention is to produce selenium ruby glass in successive batches or in a continuous manner with a uniform color and shade.

Other objects of the invention will appear hereinafter.

The above objects may be accomplished, in general, by including, as an essential element in a selenium ruby glass batch, sodium peroxide. A noticeable improvement in the production of selenium ruby glass will be obtained by including, in a selenium ruby glass batch, 2% by weight of sodium peroxide. On the other hand, as much as 15% or even 20% by weight of the selenium ruby glass batch may, to advantage, be sodium peroxide. It is preferred, however, that the glass batch contain between 3% and 6% by weight of sodium peroxide to obtain best results.

In order to prevent upsetting the silica-lime-soda balance of a particular glass composition, it is preferred to replace the sodium carbonate content of a previously known selenium glass batch composition with sodium peroxide on a mole for mole basis. This is illustrated in the examples which follow. However, if a glass composition contains sodium carbonate in the lower portion of the permissible range, some improvement in reducing loss of selenium may be obtained by merely adding sodium peroxide to the ingredients of a selenium ruby glass batch composition. The amount of sodium peroxide in the glass batch composition is also largely dependent upon economic considerations, the sodium peroxide being much more expensive than sodium carbonate. It is preferred that the selenium ruby glass batch compositions of this invention contain between 10% and 22% by weight of sodium carbonate and between 2% and 6% by weight of sodium peroxide, with the total content of sodium carbonate and sodium peroxide not more than 25% by weight of the batch.

The following examples are given to illustrate, in detail, certain preferred methods of carrying out the present invention, it being understood that the invention is not limited to the details set forth therein.

*Example I*

Glass batches were prepared containing sodium peroxide substituted for the sodium carbonate in the following proportions: 0%, 10%, 20%, 33⅓%, 66⅔%, 100%.

| | Parts by Weight | | | | | |
|---|---|---|---|---|---|---|
| | 1 | 2 | 3 | 4 | 5 | 6 |
| Sand | 105 | 105 | 105 | 105 | 105 | 105 |
| Sodium Carbonate | 44 | 39.6 | 35.2 | 29.3 | 14.65 | 0.0 |
| Sodium Peroxide | 0.0 | 3.24 | 6.48 | 10.8 | 21.6 | 32.4 |
| Potassium Carbonate | 10.5 | 10.5 | 10.5 | 10.5 | 10.5 | 10.5 |
| Zinc Oxide | 13.5 | 13.5 | 13.5 | 13.5 | 13.5 | 13.5 |
| Aluminum Oxide | 1.8 | 1.8 | 1.8 | 1.8 | 1.8 | 1.8 |
| Calcium Oxide | 1.2 | 1.2 | 1.2 | 1.2 | 1.2 | 1.2 |
| Bone Ash | 1.0 | 1.0 | 1.0 | 1.0 | 1.0 | 1.0 |
| Al (Powder) | 0.2 | 0.2 | 0.2 | 0.2 | 0.2 | 0.2 |
| Sodium Selenite | 3.28 | 3.28 | 3.28 | 3.28 | 3.28 | 3.28 |
| Cadmium Sulfide | 1.5 | 1.5 | 1.5 | 1.5 | 1.5 | 1.5 |

The batches were melted in crucibles in an enclosed furnace in which the temperature was allowed to rise to 2200–2300° F. while maintaining reducing flame conditions. The melt was subjected to the usual fining treatment for removal of bubbles.

Three sets of samples were taken, (1) after melting had proceeded for three hours, (2) after melting had proceeded for 7 hours, and (3) after melting had proceeded for 8½ hours. In all cases, the improvement in intensity of color with increasing percentages of peroxide was pronounced. The glass containing 100% sodium carbonate was orange while the glass in which 100% sodium peroxide had been substituted for the sodium carbonate was a very dense ruby. The intermediate compositions showed a gradation of color shade depending upon the percent of substitution of sodium peroxide for sodium carbonate in the melt, the substitution of sodium peroxide for only 10% of the sodium carbonate on a mole for mole basis making a distinct improvement in the depth of color.

*Example II*

A second experiment was run in which 25%, 50% and 100% sodium peroxide was substituted for the sodium carbonate in a selenium ruby glass batch in which cadmium sulfo-selenide was used as colorant.

| | Batches, Parts by Weight | | | | | | | |
|---|---|---|---|---|---|---|---|---|
| | 1 | 2 | 3 | 4 | 5 | 6 | 7 | 8 |
| Sand | 105 | 105 | 105 | 105 | 105 | 105 | 105 | 105 |
| Sodium Carbonate | 44 | 33 | 22 | 0 | 44 | 33 | 22 | 0 |
| Sodium Peroxide | 0 | 8.1 | 16.2 | 32.4 | 0 | 8.1 | 16.2 | 32.4 |
| Zinc Oxide | 13.5 | 13.5 | 13.5 | 13.5 | 13.5 | 13.5 | 13.5 | 13.5 |
| Potassium Carbonate | 10.5 | 10.5 | 10.5 | 10.5 | 10.5 | 10.5 | 10.5 | 10.5 |
| Alumina | 1.8 | 1.8 | 1.8 | 1.8 | 1.8 | 1.8 | 1.8 | 1.8 |
| Calcium Oxide | 1.2 | 1.2 | 1.2 | 1.2 | 1.2 | 1.2 | 1.2 | 1.2 |
| Bone Ash | 1.0 | 1.0 | 1.0 | 1.0 | 1.0 | 1.0 | 1.0 | 1.0 |
| Aluminum | 0.2 | 0.2 | 0.2 | 0.2 | 0.2 | 0.2 | 0.2 | 0.2 |
| Cadmium Sulfide | 1.5 | 1.5 | 1.5 | 1.5 | 1.5 | 1.5 | 1.5 | 1.5 |
| Cadmium Sulfoselenide | 4.2 | 4.2 | 4.2 | 4.2 | 8.4 | 8.4 | 8.4 | 8.4 |

The batches were heated to 2200 to 2300° F. in crucibles in an enclosed furnace with a soft reducing flame, i. e., a flame in which oxygen is insufficient for complete combustion so as to prevent oxidation of crucible or glass tank contents. Samples were gathered when sand free, pressed out, allowed to cool and subsequently "warmed in," i. e., reheated until the color strikes.

As the sodium peroxide content was increased at the expense of the sodium carbonate content, the glass became more orange or ruby and less yellow, also less muddy and more clear. The best glass (clear, ruby, slightly weak) was made with 8.46 parts by weight cadmium sulfoselenide, 1.5 parts by weight cadmium sulfide and 100% sodium peroxide (batch 8 above).

*Example III*

A third experiment was made to determine the effect of 100% substitution of sodium peroxide for sodium carbonate in selenium ruby using increased amounts of cadmium sulfoselenide and with and without cadmium sulfide.

| | Batches, Parts by Weight | | | | |
|---|---|---|---|---|---|
| | 1 | 2 | 3 | 4 | 5 |
| Sand | 105 | 105 | 105 | 105 | 105 |
| Sodium Carbonate | 0 | 44 | 0 | 44 | 0 |
| Sodium Peroxide | 32.4 | 0 | 32.4 | 0 | 32.4 |
| Zinc Oxide | 13.5 | 13.5 | 13.5 | 13.5 | 13.5 |
| Potassium Carbonate | 10.5 | 10.5 | 10.5 | 10.5 | 10.5 |
| Alumina | 1.8 | 1.8 | 1.8 | 1.8 | 1.8 |
| Calcium Oxide | 1.2 | 1.2 | 1.2 | 1.2 | 1.2 |
| Bone Ash | 1.0 | 1.0 | 1.0 | 1.0 | 1.0 |
| Aluminum | 0.2 | 0.2 | 0.2 | 0.2 | 0.2 |
| Cadmium Sulfide | 0.0 | 0.0 | 0.0 | 1.5 | 1.5 |
| Cadmium Sulfoselenide | 8.46 | 10.5 | 10.5 | 10.5 | 10.5 |

The batches were heated to 2220 to 2300° F. in crucibles in an enclosed furnace using a soft flame. Samples were gathered when sand free, pressed out, cooled and subsequently "warmed in."

In this series of experiments, the substitution of 100% sodium peroxide for the sodium carbonate produced ruby glass, while the control run using 100% sodium carbonate produced yellow glass. The best ruby glass was produced in the run using 10.5 parts by weight sulfoselenide, no cadmium sulfide, and 100% sodium peroxide. It was clear, of good tone, and nearly as deep as the standard selenium plate.

Analyses of the residues remaining in the pot indicated that the use of sodium peroxide slightly increased the amount of cadmium selenide held in the glass and greatly increased the amount of cadmium sulfide retained. It has been known that the loss of selenium by volatilization occurs largely in the early stages of heating of the glass batch. It has also been known that sodium peroxide is substantially decomposed at temperatures lower than 600° F.

It has now been determined that the sodium peroxide stabilizes the selenium and keeps it in the melt in the form that is most effective for producing intense color, thus reducing loss of selenium coloring compound from the melt and enabling more intense color to be produced with less selenium. The sodium peroxide is believed to function in a reducing capacity.

Increased stability of selenium may make it possible to operate as a continuous tank process instead of a batch process in closed pots. The continuous process is more economical and desirable from a practical point of view.

The stabilization of the selenium results in a decrease of selenium fumes about the pot or tank, which fumes constitute a health hazard to workmen.

The selenium glass batch may, of course, contain other glass ingredients than those contained in the batches set forth in the examples. The process of the present invention is applicable to all selenium glass batches suitable for use in the production of ruby glass.

Since it is obvious that many changes and modifications can be made in the above-described details without departing from the nature and spirit of the invention, it is to be understood that the invention is not to be limited to said details except as set forth in the appended claims.

I claim:

1. A selenium ruby glass batch composition containing, as an essential ingredient, sodium peroxide.

2. A selenium ruby glass batch composition containing, as an essential ingredient, between 2% and 20% by weight of sodium peroxide.

3. A selenium ruby glass batch composition containing, as an essential ingredient, between 3% and 6% by weight of sodium peroxide.

4. A selenium ruby glass batch composition containing, as an essential ingredient, between 3% and 6% by weight of sodium peroxide and between 10% and 22% by weight of sodium carbonate, the total content of sodium peroxide and sodium carbonate being not more than 25% by weight.

5. The process of producing selenium ruby glass which comprises including in a selenium ruby glass batch composition, sodium peroxide.

6. The process of producing selenium ruby glass which comprises including in a selenium ruby glass batch composition, between 2% and 20% by weight of sodium peroxide.

7. The process of producing selenium ruby glass which comprises including in a selenium ruby glass batch composition, between 3% and 6% by weight of sodium peroxide.

8. The process of producing selenium ruby glass which comprises including in a selenium ruby glass batch composition, between 3% and 6% by weight of sodium peroxide, said batch containing between 10% and 22% by weight of sodium carbonate, the total content of sodium peroxide and sodium carbonate not exceeding 25% by weight of the batch.

JOHN M. YOUEL.

REFERENCES CITED

The following references are of record in the file of this patent:

UNITED STATES PATENTS

| Number | Name | Date |
|---|---|---|
| 2,230,199 | Dobrovalny | Jan. 28, 1941 |
| 1,488,914 | Gelstharp | Apr. 1, 1924 |

Certificate of Correction

Patent No. 2,418,684.   April 8, 1947.

JOHN M. YOUEL

It is hereby certified that error appears in the printed specification of the above numbered patent requiring correction as follows: Column 3, line 71, for the numeral "2220" read *2200*; and that the said Letters Patent should be read with this correction therein that the same may conform to the record of the case in the Patent Office.

Signed and sealed this 3rd day of June, A. D. 1947.

[SEAL]

LESLIE FRAZER,
*First Assistant Commissioner of Patents.*